(12) United States Patent
Lee et al.

(10) Patent No.: US 9,088,411 B1
(45) Date of Patent: Jul. 21, 2015

(54) MODEM AND DRIVING METHOD THEREOF

(71) Applicants: Hae-Chul Lee, Incheon (KR);
Chae-Hag Yi, Gyeonggi-do (KR);
Jun-Ho Huh, Gyeonggi-do (KR)

(72) Inventors: Hae-Chul Lee, Incheon (KR);
Chae-Hag Yi, Gyeonggi-do (KR);
Jun-Ho Huh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/497,658

(22) Filed: Sep. 26, 2014

(30) Foreign Application Priority Data

Jan. 22, 2014 (KR) .................. 10-2014-0007925

(51) Int. Cl.
*H04B 1/38* (2006.01)
*H04L 5/16* (2006.01)
*H04L 5/14* (2006.01)
*H04L 7/00* (2006.01)
*H04L 25/02* (2006.01)

(52) U.S. Cl.
CPC .............. *H04L 5/14* (2013.01); *H04L 7/0008* (2013.01); *H04L 25/0212* (2013.01)

(58) Field of Classification Search
CPC ...... H04L 5/14; H04L 7/0008; H04L 25/0212
USPC ........................................... 375/222
See application file for complete search history.

(56) References Cited

U.S. PATENT DOCUMENTS

| | | | |
|---|---|---|---|
| 6,028,901 A * | 2/2000 | Huynh et al. ................. 375/350 |
| 6,680,968 B2 | 1/2004 | Black et al. | |
| 6,925,112 B1 | 8/2005 | Morejon et al. | |
| 8,243,777 B2 | 8/2012 | Yang et al. | |
| 8,625,684 B2 | 1/2014 | Kim | |
| 2004/0151269 A1* | 8/2004 | Balakrishnan et al. ........ 375/355 |
| 2009/0251364 A1* | 10/2009 | Lorenz ...................... 342/357.02 |
| 2010/0304744 A1* | 12/2010 | Hu et al. ........................ 455/434 |
| 2011/0013685 A1* | 1/2011 | McKown ....................... 375/232 |
| 2011/0149943 A1* | 6/2011 | Srinivasan et al. ............. 370/343 |
| 2011/0158342 A1* | 6/2011 | Srinivasan et al. ............. 375/285 |
| 2013/0101063 A1* | 4/2013 | Jiang et al. .................... 375/285 |
| 2014/0153420 A1* | 6/2014 | Garin et al. .................... 370/252 |

FOREIGN PATENT DOCUMENTS

| | | |
|---|---|---|
| EP | 2437450 | 4/2012 |
| KR | 1020100001592 | 1/2010 |
| KR | 101223783 | 1/2013 |
| WO | WO 2010/145176 | 12/2010 |

OTHER PUBLICATIONS

Christian Mehlfuhrer et al., Novel Tap-wise LMMSE Channel Estimation for MIMO W-CDMA, Institute of Communciations and Radio-Frequency Engineering Vienna University of Technology, IEEE GLOBECOM, 2008. (pp. 6).

* cited by examiner

*Primary Examiner* — Erin File

(74) *Attorney, Agent, or Firm* — The Farrell Law Firm, P.C.

(57) ABSTRACT

Methods and apparatuses are provided for driving a modem. A Channel Impulse Response (CIR) is computed through channel estimation. An estimation time position is estimated by applying a weighted-average method to the CIR. A time offset is measured by comparing the estimation time position with a reference time position. The time offset is compensated for.

16 Claims, 12 Drawing Sheets

MODEM AND DRIVING METHOD THEREOF

PRIORITY

This application claims priority under 35 U.S.C. §119(a) to Korean Patent Application No. 10-2014-0007925, filed on Jan. 22, 2014, the disclosure of which is incorporated herein by reference.

BACKGROUND OF THE INVENTION

1. Field of the Invention

The present invention relates generally to a modem, and more particularly, to a modem and a driving method thereof that estimates and compensates for a time offset due to time drift.

2. Description of the Related Art

In a wireless communication system, a clock source used in a transceiver (for example, a base transceiver station) and a clock source used in a receiver (for example, a terminal) may be different from each other. Thus, time drift between the transceiver and the receiver can occur due to a drift of each clock. If the time drift is not compensated for, receiving performance can be degraded. Accordingly, the receiver estimates time drift and compensates for the time drift.

A Code Division Multiple Access (CDMA) system can track time drifts using various methods. In the case of a rake receiver, time drifts are tracked in fingers using an Early-Late tracking loop method, a Tau-Dither tracking loop method, or modification methods thereof.

A receiver supporting a High-Speed Downlink Packet Access (HSDPA) protocol uses a chip-level channel equalization receiving method, instead of a rake receiver, to obtain improved performance, and to this end, channel estimation is performed in units of chips or in units of sub-chips.

SUMMARY OF THE INVENTION

The present invention has been made to address at lest the above problems and/or disadvantages and to provide at least the advantages described below. Accordingly, an aspect of the present invention provides a modem in which a time offset is measured and compensated for using a CIR, which is generated by estimating a channel in units of sub-chips.

Another aspect of the present invention provides a driving method of a modem.

An additional aspect of the present invention provides a mobile device including the modem.

In accordance with an aspect of the present invention, a modem is provided that includes a channel estimator configured to compute a Channel Impulse Response (CIR) through channel estimation. The modem also includes a time tracker configured to estimate an estimation time position by applying a weighted-average method to the CIR, measure a time offset by comparing the estimation time position with a reference time position, and compensate for the time offset.

In accordance with another aspect of the present invention, a method is provided for driving a modem. A CIR is computed through channel estimation. An estimation time position is estimated by applying a weighted-average method to the CIR. A time offset is measured by comparing the estimation time position with a reference time position. The time offset is compensated for.

In accordance with still another aspect of the present invention, a mobile device is provided that includes a modem configured to receive a data signal from a base transceiver station, and an application processor configured to receive the data signal from the modem. The modem includes a channel estimator configured to compute a CIR through channel estimation, and a time tracker configured to estimate an estimation time position by applying a weighted-average method to the CIR, measure a time offset by comparing the estimation time position with a reference time position, and compensate for the time offset.

In accordance with an additional aspect of the present invention, an article of manufacture is provided for driving a modem. The article of manufacture includes a machine readable medium containing one or more programs which when executed implement the steps of: computing a CIR through channel estimation; estimating an estimation time position by applying a weighted-average method to the CIR; measuring a time offset by comparing the estimation time position with a reference time position; and compensating for the time offset.

In accordance with a further aspect of the present invention, a modem is provided that includes an on-late sampler configured to receive data and output an on-sample signal and a late-sample signal based on the data. The modem also includes a data buffer configured to receive the on-sample signal and the late-sample signal from the on-late sampler, and output the on-sample signal and the late-sample signal. The modem further includes a channel estimator configured to receive the on-sample signal and the late-sample signal from the data buffer, perform channel estimation using the on-sample signal and the late-sample signal to generate a CIR, and output the CIR. The modem additional includes a time tracker configured to receive the CIR from the channel estimator, measure a time offset of a chip unit and a time offset of a sub-chip unit using the CIR, regulate timing of the data buffer using the time offset of the chip unit, and regulate timing of the on-late sampler using the time offset of the sub-chip unit.

In accordance with another aspect of the present invention, a method is provided for driving a modem. Data is received at an on-late sampler of the modem for generation of an on-sample signal and a late-sample signal. The on-sample signal and the late-sample signal are transmitted from the on-late sampler to a data buffer of the modem. The on-sample signal and the late-sample signal are transmitted from the data buffer to a channel estimator of the modem. Channel estimation is performed, at the channel estimator, using the on-sample signal and the late-sample signal to generate a CIR. The CIR is transmitted from the channel estimator to a time tracker of the modem. A time offset of a chip unit and a time offset of a sub-chip unit are measured at the time tracker using the CIR. Timing of the data buffer is regulated using the time offset of the chip unit, and timing of the on-late sampler is regulated using the time offset of the sub-chip unit.

In accordance with an aspect of the present invention, an article of manufacture is provided for driving a modem. The article of manufacture includes a machine readable medium containing one or more programs which when executed implement the steps of: receiving data at an on-late sampler of the modem for generation of an on-sample signal and a late-sample signal; transmitting the on-sample signal and the late-sample signal from the on-late sampler to a data buffer of the modem; transmitting the on-sample signal and the late-sample signal from the data buffer to a channel estimator of the modem; perform channel estimation, at the channel estimator, using the on-sample signal and the late-sample signal to generate a Channel Impulse Response (CIR); transmitting the CIR from the channel estimator to a time tracker of the modem; measuring, at the time tracker, a time offset of a chip unit and a time offset of a sub-chip unit using the CIR; and regulating timing of the data buffer using the time offset of the chip unit, and regulating timing of the on-late sampler using the time offset of the sub-chip unit.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
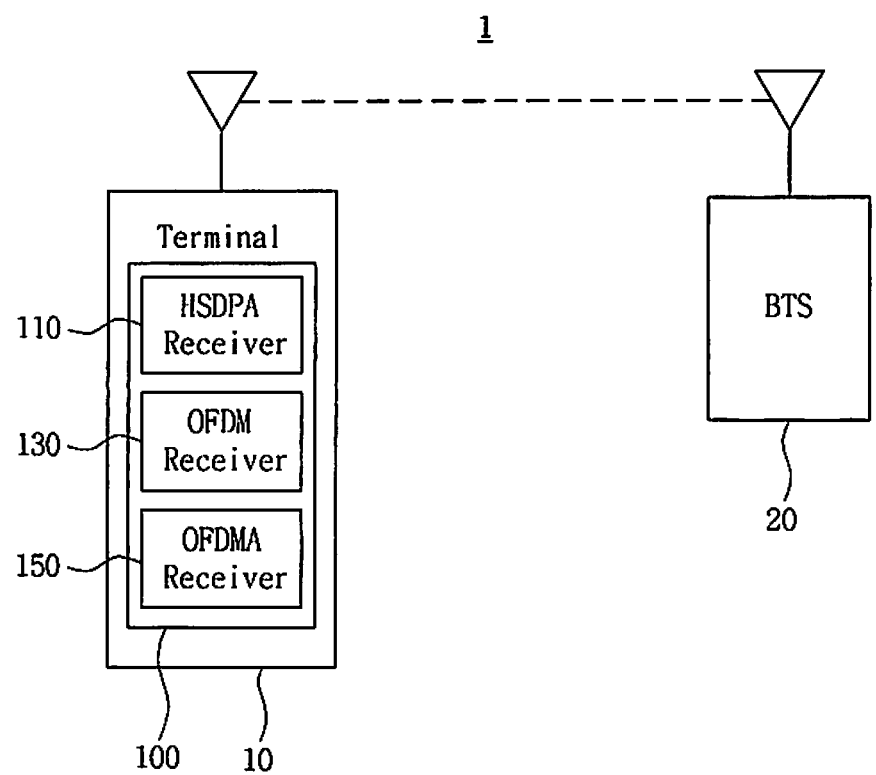
FIG. 1 is a block diagram illustrating a communication system, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

It will be understood that when an element or layer is referred to as being "on", "connected to", or "coupled to" another element or layer, it can be directly on, connected to, or coupled to the other element or layer or intervening elements or layers may be present. In contrast, when an element is referred to as being "directly on", "directly connected to", or "directly coupled to" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section could be termed a second element, component, region, layer, or section without departing from the teachings of embodiment of the present invention.

Spatially relative terms, such as, for example, "beneath", "below", "lower", "above", "upper", and the like, may be used herein for ease of description to describe one element's or feature's relationship to another element or feature, as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to limit the present invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described herein with reference to cross-sectional illustrations that are schematic illustrations of idealized embodiments (and intermediate structures). As such, variations from the shapes of the illustrations as a result of manufacturing techniques and/or tolerances are to be expected. Thus, embodiments of the present invention should not be construed as limited to the particular shapes of regions illustrated herein, but are to include deviations in shapes that result from manufacturing, for example. For example, an implanted region illustrated as a rectangle will typically have rounded or curved features and/or a gradient of implant concentration at its edges, rather than a binary change from implanted to non-implanted region. Likewise, a buried region formed by implantation may result in some implantation in the region between the buried region and the surface through which the implantation takes place. Thus, the regions illustrated in the figures are schematic in nature, and their shapes are not intended to illustrate the actual shape of a region of a device or to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

FIG. 1 is a block diagram illustrating a communication system, according to an embodiment of the present invention.

Referring to FIG. 1, a communication system 1 includes a terminal 10 and a base transceiver station 20. The terminal 10 includes a modem 100 configured to receive data from the base transceiver station 20. The modem 100 includes one of an HSDPA receiver 110, an OFDM receiver 130, and an OFDMA receiver 150. The modem 100, according to an embodiment of the present invention, may further include another receiver.

If the terminal 10 is a smart-phone or a tablet Personal Computer (PC), the terminal 10 may further include an application processor configured to receive a data signal from the modem 100, a display panel configured to display a screen, a touch panel configured to receive touch input, and so on.

Figure 2:
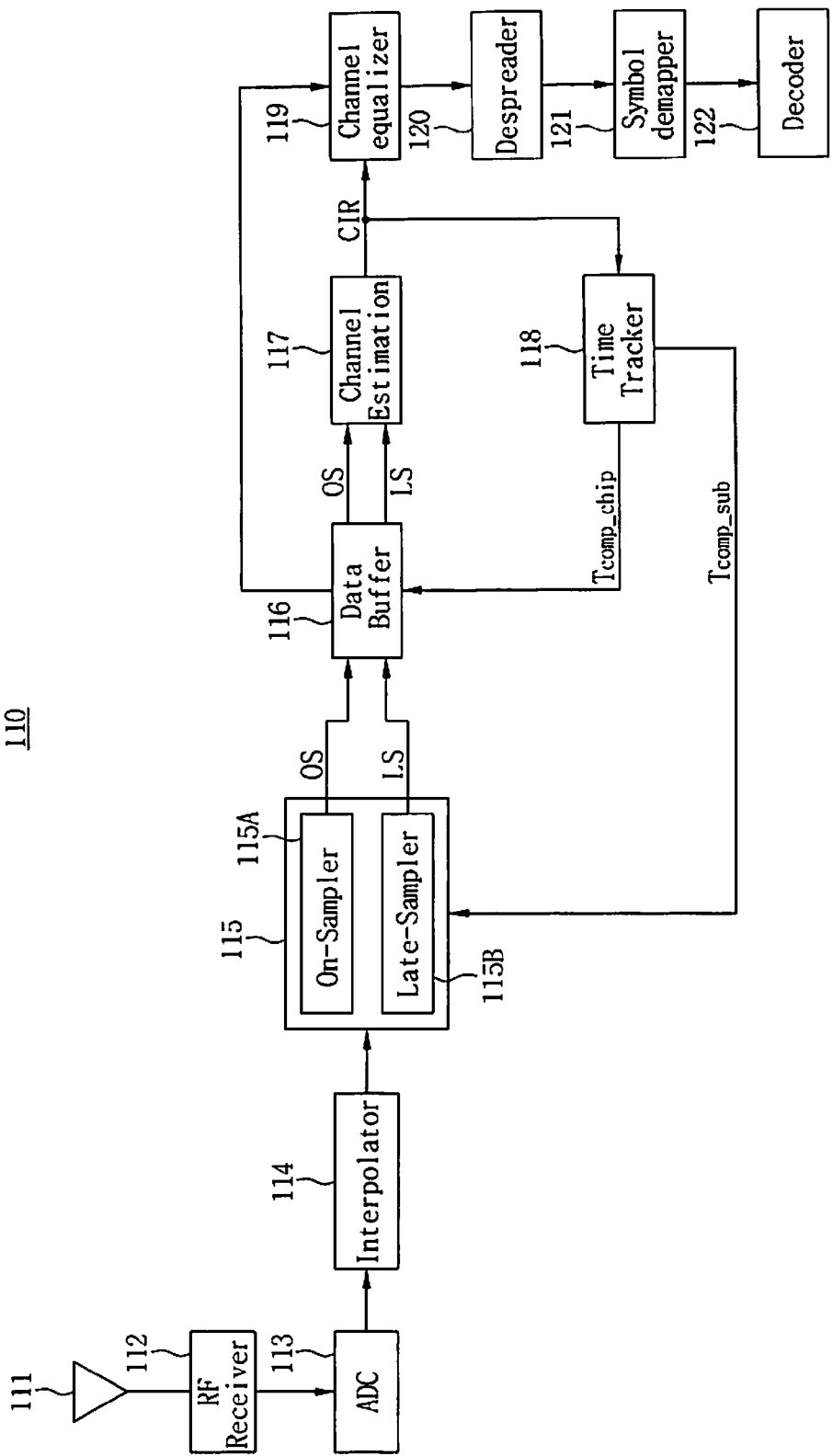
FIG. 2 is a block diagram illustrating an HSDPA receiver of FIG. 1, according to an embodiment of the present invention.

FIG. 2 is a block diagram illustrating the HSDPA receiver of FIG. 1, according to an embodiment of the present invention.

The HSDPA receiver 110 operates according to HSDPA standards.

The HSDPA receiver 110 includes a receiving (Rx) antenna 111, a Radio Frequency (RF) receiver 112, an Analog-Digital Converter (ADC) 113, an interpolator 114, an on-late sampler 115, a data buffer 116, a channel estimator 117, a time tracker 118, a channel equalizer 119, a despreader 120, a symbol demapper 121, and a decoder 122.

The RF receiver 112 outputs a signal received through the Rx antenna 111 to the ADC 113. The ADC 113 converts an analog signal output from the RF receiver 112 into a digital signal, and transmits the digital signal to the interpolator 114.

The interpolator 114 receives data from the ADC 113, and performs interpolation. In an embodiment of the present invention, the interpolator 114 receives 1× chip rate data, and generates 8× chip rate data.

Because the HSDPA receiver 110 generates the 8× chip rate data in the interpolator 114, a time offset may be tracked in units of 1/8 chip duration. If interpolation with a higher chip rate (for example, 16× or 32×) is performed in the HSDPA receiver 110, the time offset may be more precisely tracked in units of 1/16 or 1/32 chip duration.

The on-late sampler 115 receives interpolated data, and generates data to perform channel estimation using the received data. The on-late sampler 115 includes an on sampler 115A and a late sampler 115B. The on sampler 115A transmits an on-sample signal OS to the data buffer 116. The late sampler 115B transmits a late-sample signal LS to the data buffer 116. The on-late sampler 115 compensates for a time offset of a sub-chip unit. Input and output of the on-late sampler 115 is described in greater detail below with reference to FIG. 3.

The data buffer 116 receives the on-sample signal OS and the late-sample signal LS from the on-late sampler 115, and transmits the signals OS and LS to the channel estimator 117. The data buffer 116 receives a time offset value of a chip unit from the time tracker 118, and may compensate for the time offset of a chip unit.

The channel estimator 117 performs channel estimation using the on-sample signal OS and the late-sample signal LS output from the data buffer 116. The channel estimator 117 outputs a CIR as the channel estimation result to the time tracker 118 and the channel equalizer 119. The channel estimator 117 is described in greater detail below, with reference to FIG. 5.

The time tracker 118 may measure a time offset $T_{comp\_chip}$ of a chip unit and a time offset $T_{comp\_sub}$ of a sub-chip unit using the CIR. To compensate for time drift, the time tracker 118 may regulate timing of the data buffer 116 using the time offset $T_{comp\_chip}$ of a chip unit. Further, the time tracker 118 may regulate timing of the on-sample signal OS and the late-sample signal LS of the on-late sampler 115 using the time offset $T_{comp\_sub}$ of a sub-chip unit. The time tracker 118 is described in greater detail below, with reference to FIG. 5.

The channel equalizer 119 receives the CIR from the channel estimator 117. Further, the channel equalizer 119 receives a data signal from the data buffer 116. The channel equalizer 119 restores distortion of the received data signal based on the CIR. The channel equalizer 119 performs channel equalization of the data signal, and outputs the channel equalized data signal to the despreader 120.

The despreader 120 despreads the spread signal, and transmits the despread signal to the symbol demapper 121. The symbol demapper 121 demodulates a signal output from the despreader 120 using a demodulation method corresponding to a modulation method applied to a transceiver of the communication system 1, and outputs the demodulated signal to the decoder 122. The decoder 122 decodes a signal output from the symbol demapper 121 using a decoding method corresponding to a coding method applied to the transceiver of the communication system 1.

Figure 3:
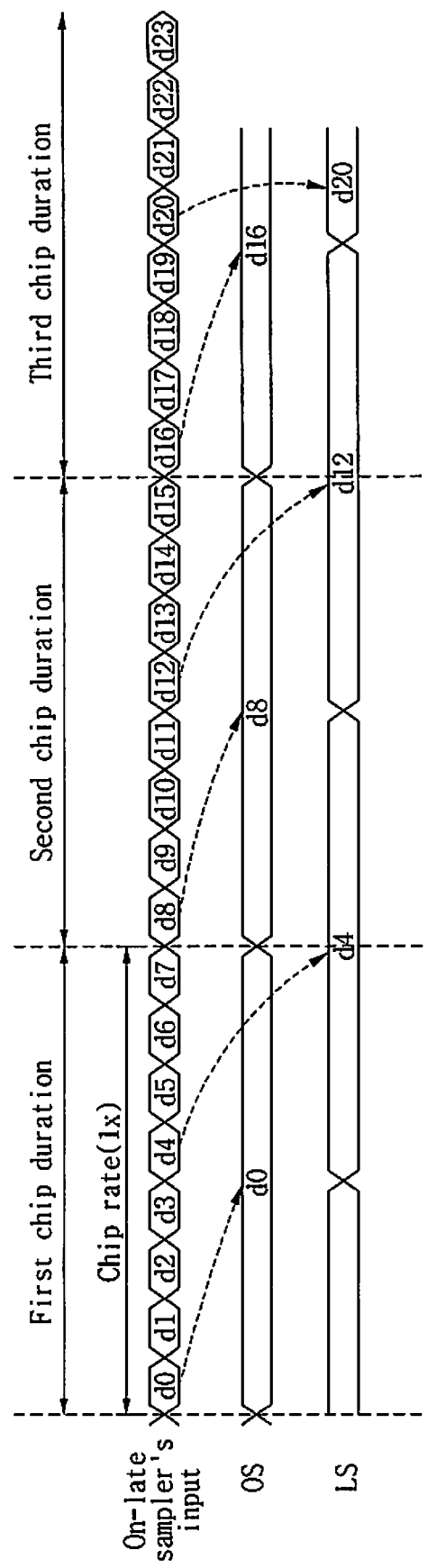
FIG. 3 is a timing diagram illustrating input and output of an on-late sampler of FIG. 2, according to an embodiment of the present invention.

FIG. 3 is a timing diagram illustrating input and output of the on-late sampler of FIG. 2, according to an embodiment of the present invention.

Referring to FIGS. 2 and 3, the on-late sampler 115 compensates for a time offset of a sub-chip unit. The on sampler 115A outputs an on-sample signal OS. The late sampler 115B outputs a late-sample signal LS.

It is assumed that the channel estimator 117 estimates a channel in units of ½ chips. The interpolator 114 transmits data interpolated with 8× chip rate to the on-late sampler 115. For example, during a first chip duration, the on-late sampler 115 may receive d0, d1, d2, d3, d4, d5, d6, and d7 signals. During a second chip duration, the on-late sampler 115 may receive d8, d9, d10, d11, d12, d13, d14, and d15 signals. Further, during a third chip duration, the on-late sampler 115 may receive d16, d17, d18, d19, d20, d21, d22, and d23 signals.

In normal operation (when there is no time offset), the on sampler 115A transmits d0, d8, and d16 signals as an on-sample signal OS to the channel estimator 117. The late sampler 115B outputs a data signal ½ chip later than the on sampler 115A. In other words, the late sampler 115B transmits d4, d12, and d20 signals as a late-sample signal LS to the channel estimator 117.

If it is assumed that the channel estimator 117 estimates a channel in units of ¼ chips, the number of output signals of the on-late sampler 115 may be four. Namely, there are on-sample signals OS, ¼ late-sample signals, 2/4 late-sample signals, and ¾ late-sample signals as output signals of the on-late sampler 115. For example, the on-sample signals OS may be d0, d8, d16, d24, etc. The ¼ late-sample signals may be d2, d10, d18, d26, etc. The 2/4 late-sample signals may be d4, d12, d20, d28, etc. The ¾ late-sample signals may be d6, d14, d22, d30, etc.

Units with respect to chips (for example, whether the channel estimator 117 estimates a channel in units of ½ chips or ¼ chips) in which a channel is estimated in the channel estimator 117 may be determined considering a size of hardware resources and expected performance.

Figure 4:
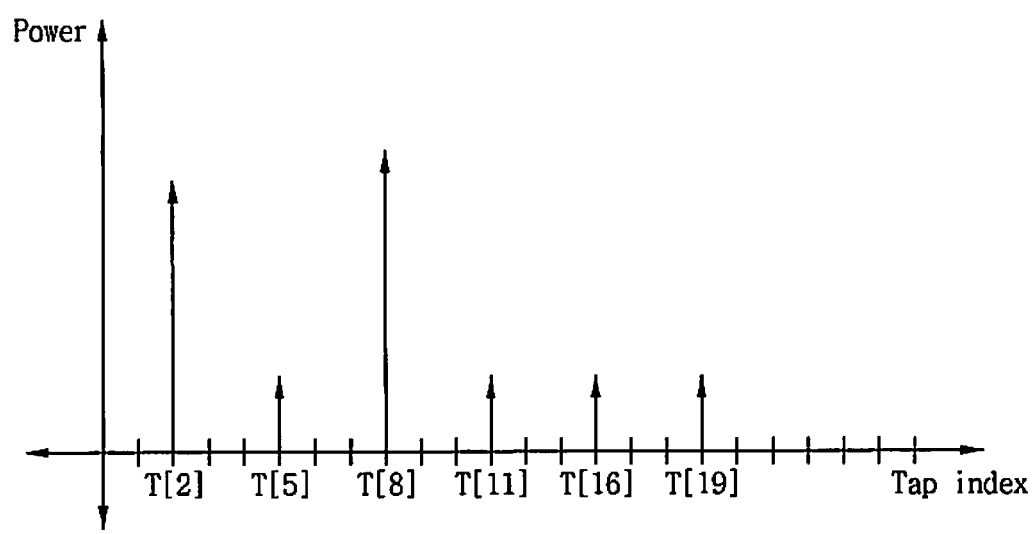
FIG. 4 is a graph showing a channel estimation result from a channel estimator of FIG. 2, according to an embodiment of the present invention.

FIG. 4 is a graph showing a channel estimation result by the channel estimator of FIG. 2, according to an embodiment of the present invention.

Referring to FIGS. 1, 2 and 4, the channel estimator 117 may measure a correlation with respect to a channel response according to a tap. The channel estimator 117 may compute a CIR through the correlation.

The base transceiver station 20 scrambles a Common Pilot Channel (CPICH) signal spread by a diffusion coefficient of 256 with a scramble code signal of the base transceiver station 20, and transmits it to the terminal 10. The terminal 10 may receive the CPICH signal transmitted from the base transceiver station 20, and perform channel estimation.

Because a multipath phenomenon may occur depending on circumstances, there may be signals reflected depending on a channel environment between the base transceiver station 20 and the terminal 10.

The channel estimator 117 may estimate a channel in units of taps using a combination (i.e., a reference signal ref) of the CPICH signal and the scramble code signal. The channel estimator 117 may compute a CIR through this process. In an embodiment of the present invention, a tap may be set in units of ½, ¼, ⅛, 1/16, 1/32 or 1/64 sub-chips.

For example, a signal detected in a second tap T[2] is a signal directly received from the base transceiver station 20, and a signal detected in a tap T[8] is a signal reflected by surrounding objects. The second and eighth taps T[2] and T[8] may be valid taps, and other taps (i.e., fifth, eleventh, sixteenth, and nineteenth taps T[5], T[11], T[16], and T[19]) may be noise.

Figure 5:
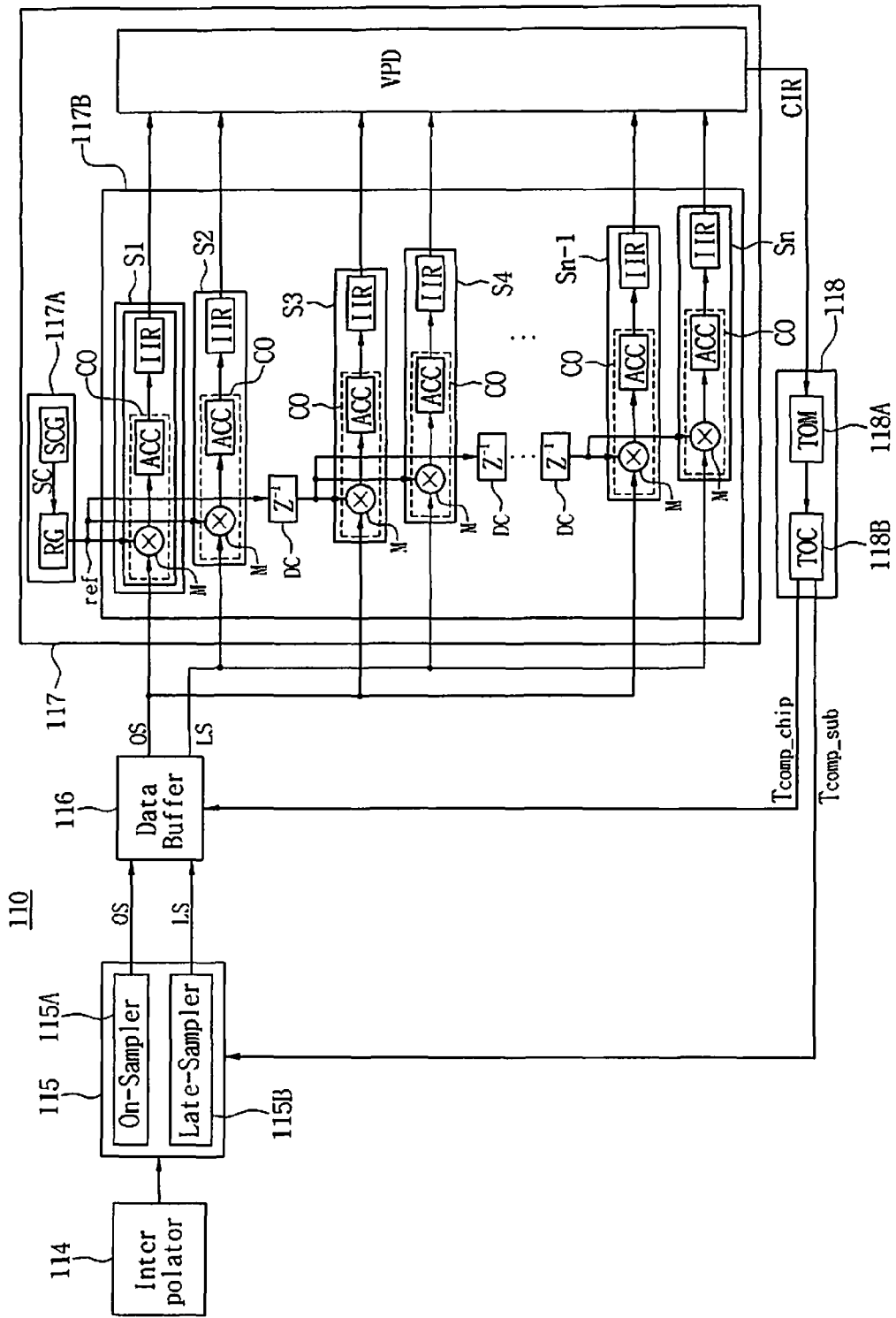
FIG. 5 is a block diagram illustrating the channel estimator and a time tracker of FIG. 2, according to an embodiment of the present invention.

FIG. 5 is a block diagram illustrating the channel estimator and the time tracker of FIG. 2, according to an embodiment of the present invention.

Referring to FIGS. 1, 2 and 5, the channel estimator 117 includes a Pseudo Noise (PN) code generator 117A, a sub-channel estimator 117B, and a Valid Path Detector (VPD).

The PN code generator 117A includes a Scrambler Code Generator (SCG) and a Reference Generator (RG). The SCG generates a scramble code signal SC identifying the base transceiver station 20. The RG multiplies a CPICH signal and the scramble code signal SC, performs a conjugate operation on the multiplied result, and generates a reference signal ref.

The sub-channel estimator 117B includes first to $n^{th}$ sub-chip channel estimators S1 to Sn, and n/2 Delay Components (DC).

In an embodiment of the present invention, a tap is set in units of sub-chips. To estimate a channel in units of sub-chips, the channel estimator 117 may include as many of the sub-chip channel estimators as the number of taps. For example, when the tap is set in units of ½ chips, the sub-channel estimator 117B estimates in units of ½ chips.

Odd-numbered sub-chip channel estimators, such as the first, third, and fifth sub-chip channel estimators S1, S3, and S5, and so on, receive the on-sample signal OS. Even-numbered sub-chip channel estimators, such as the second, fourth, and sixth sub-chip channel estimators S2, S4, and S6, and so on, receive the late-sample signal LS.

Each of the first to $n^{th}$ sub-chip channel estimators S1 to Sn includes a Correlation Operator (CO), and an Infinite Impulse Response (IIR) filter.

The CO includes a multiplier M configured to multiply the reference signal ref and a data signal received from the data buffer 116, and an accumulator ACC configured to accumulate the multiplied result. The accumulator ACC may accumulate the result multiplied by 256 corresponding to a spreading factor of the CPICH signal. The accumulator ACC accumulates the multiplied result in units of 256 chips, and is initialized in units of 256 chips.

In the first sub-chip channel estimator S1, the CO computes a correlation between the on-sample signal OS and the reference signal ref. If the correlation between the on-sample signal OS and the reference signal ref is high, the CO may output a value with a great absolute value. Otherwise, the CO may output a value with a small absolute value. The IIR filter removes noise by filtering output of the CO, and transmits the filtered result to the VPD. In an embodiment of the present invention, the IIR filter may be implemented as a low pass filter.

In the second sub-chip channel estimator S2, the CO computes a correlation between the late-sample signal LS and the reference signal ref. If the correlation between the late-sample signal LS and the reference signal ref is high, the CO may output a value with a great absolute value. Otherwise, the CO may output a value with a small absolute value. The IIR filter filters output of the CO, and transmits the filtered result to the VPD. The DC delays the reference signal ref by 1 chip.

In the third sub-chip channel estimator S3, the CO computes a correlation between the on-sample signal OS and the reference signal ref delayed by 1 chip. The IIR filter filters output of the CO, and transmits the filtered result to the VPD.

In the fourth sub-chip channel estimator S4, the CO computes a correlation between the late-sample signal LS and the reference signal ref delayed by 1 chip. The IIR filter filters output of the CO, and transmits the filtered result to the VPD.

Likewise, in the $(n-1)^{th}$ sub-chip channel estimator Sn−1, the CO computes a correlation between the on-sample signal OS and the reference signal ref delayed by n/2 chips. The IIR filter filters output of the CO, and transmits the filtered result to the VPD.

Further, in the e sub-chip channel estimator Sn, the CO computes a correlation between the late-sample signal LS and the reference signal ref delayed by n/2 chips. The IIR filter filters output of the CO, and transmits the filtered result to the VPD.

The VPD may extract valid taps satisfying a particular condition among correlation values measured in units of taps. The channel estimator 117 may compute a CIR through this process. The VPD transmits the valid tap (i.e., the CIR) to the time tracker 118.

The time tracker 118 includes a Time Offset Measurement (TOM) 118A and a Time Offset Compensation (TOC) 118B. The TOM 118A may estimate an estimation time position $T_p$ by obtaining a weighted average with a position of each of the valid taps and a power corresponding to each of the valid taps. The TOM 118A compares the estimation time position $T_p$ with a reference time position $T_{ref}$, and may calculate an instantaneous time offset $T_{inst\_offset}$ using the compared result. The TOM 118A may filter the instantaneous time offset $T_{inst\_offset}$, and calculate an average time offset $T_{avg\_offset}$. The TOC 118B may generate a time offset $T_{comp\_chip}$ of a chip unit and a time offset $T_{comp\_sub}$ of a sub-chip unit using the average time offset $T_{avg\_offset}$. The TOC 118B transmits the time offset $T_{comp\_chip}$ of a chip unit to the data buffer 116, and transmits the time offset $T_{comp\_sub}$ of a sub-chip unit to the on-late sampler 115.

Equation (1), set forth below, shows a weighted average method of obtaining the estimation time position $T_p$.

$$T_p = \sum_{i=0}^{N_{CETap}-1} i \cdot T[i]_{pwr} \cdot T[i]_{lock} / \sum_{i=0}^{N_{CETap}-1} T[i]_{pwr} \cdot T[i]_{lock} \quad (1)$$

$N_{CETap}$ is the number of taps. Specifically, $N_{CETap}$ is the number of the sub-chip channel estimators. $T[i]_{pwr}$ is a power of an $i^{th}$ tap. In Equation (1), if the $i^{th}$ tap is valid, $T[i]_{lock}$ is 1, and if the $i^{th}$ tap is invalid, $T[i]_{lock}$ is 0.

The TOM 118A may calculate the estimation time position $T_p$ using the weighted average method according to Equation (1). In an embodiment of the present invention, a unit of a weighted average result is ½ chip as a tap unit.

Further, the TOM 118A may measure the instantaneous time offset $T_{inst\_offset}$ using a difference between the reference time position $T_{ref}$ and the estimation time position $T_p$. The instantaneous time offset $T_{inst\_offset}$ may be computed using Equation (2), set forth below.

$$T_{inst\_offset} = T_p - T_{ref} \quad (2)$$

The TOM 118A may include a low pass filter to remove noise of the instantaneous time offset $T_{inst\_offset}$. The low pass filter may include a first IIR filter and a second IIR filter.

Equation (3), set forth below, is a formula to remove noise of the instantaneous time offset $T_{inst\_offset}$ using the first IIR filter, and to obtain the average time offset $T_{avg\_offset}$.

$$T_{avg\_offset}[n] = (1-\alpha)T_{avg\_offset}[n-1] + \alpha T_{inst\_offset}[n]$$

$$T_{avg\_offset}[0] = T_{inst\_offset}[0]$$

$$T_{avg\_offset}[n] = 0, \text{ where } n < 0 \quad (3)$$

α is a coefficient of the first IIR filtering. α is greater than 0 and less than 1. A new average time offset $T_{avg\_offset}[n]$ may be computed using a newly measured time offset $T_{inst\_offset}[n]$ and a previous average time offset $T_{avg\_offset}[n-1]$.

The TOC 118B generates the time offset $T_{comp\_chip}$ of a chip unit to regulate timing of the data buffer 116 in units of chips, and the time offset $T_{comp\_sub}$ of a sub-chip unit to regulate timing of the on-late sampler 115 in units of sub-chips.

In an embodiment of the present invention, because a unit of the average time offset $T_{avg\_offset}$ is ½ chip, the time offset $T_{comp\_chip}$ of a chip unit may be calculated using Equation (4), set forth below. The function round (x) returns the nearest integer to x.

$$T_{comp\_chip} = round(T_{avg\_offset}/2) \quad (4)$$

The time offset $T_{comp\_sub}$ of a sub-chip unit may be calculated by Equation (5), set forth below. Specifically, the time offset $T_{comp\_sub}$ may be calculated using the average time offset $T_{avg\_offset}$ and the time offset $T_{comp\_chip}$ of a chip unit. In an embodiment of the present invention, the time offset $T_{comp\_sub}$ of a sub-chip unit may be set in units of ⅛ chips as a time offset compensation unit.

$$T_{comp\_sub} = round(4*T_{avg\_offset} - 8*T_{comp\_chip}) \quad (5)$$

For example, if the time offset $T_{comp\_sub}$ of a sub-chip unit is 1, it means a time offset of +⅛ chip duration, and if the time offset $T_{comp\_sub}$ of a sub-chip unit is −1, it means a time offset of −⅛ chip duration.

In an embodiment of the present invention, the interpolator 114 outputs 8× chip rate data. Therefore, the TOC 118B may compensate for timing of the data signal in units of ⅛ chip, using the time offset $T_{comp\_sub}$ of a sub-chip unit.

A process of regulating a time offset in units of sub-chips in the on-late sampler 115 is described in greater detail below, with reference to FIG. 6.

Figure 6:
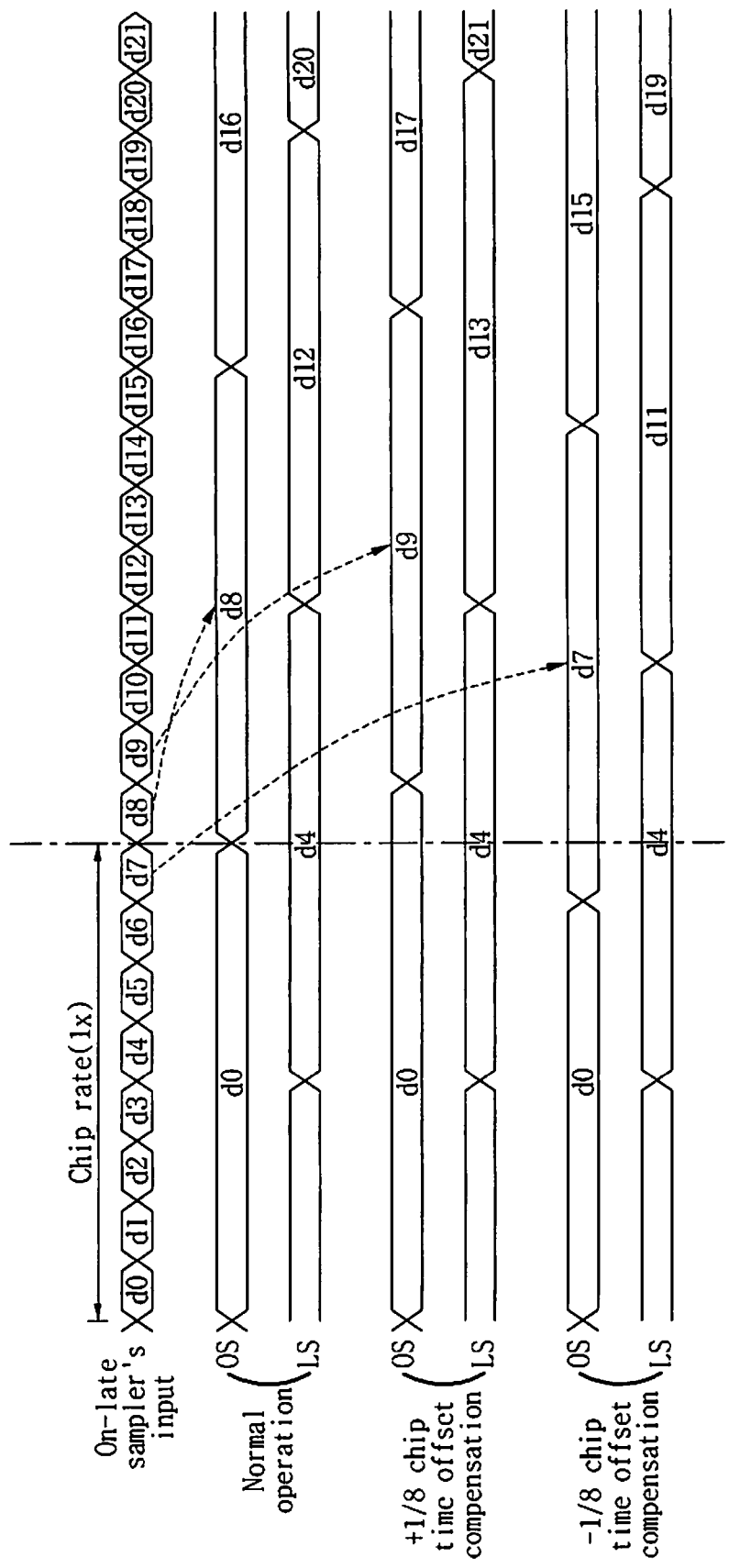
FIG. 6 is a timing diagram illustrating compensation for the time offset of a sub-chip unit in an on-late sampler of FIG. 5, according to an embodiment of the present invention.

FIG. 6 is a timing diagram illustrating compensation for the time offset of a sub-chip unit in the on-late sampler of FIG. 5, according to an embodiment of the present invention.

Referring to FIGS. 5 and 6, the on-late sampler 115 may regulate a time offset in units of sub-chips using the time offset $T_{comp\_sub}$ of a sub-chip unit.

The interpolator 114 transmits data interpolated by 8× to the on-late sampler 115. For example, during a first chip duration, the on-late sampler 115 may receive d0, d1, d2, d3, d4, d5, d6, and d7 signals. During a second chip duration, the on-late sampler 115 may receive d8, d9, d10, d11, d12, d13, d14, and d15 signals. During a third chip duration, the on-late sampler 115 may receive d16, d17, d18, d19, d20, d21, d22, and d23 signals.

The on sampler 115A outputs an on-sample signal OS. The late sampler 115B outputs a late-sample signal LS.

In normal operation (when there is no time offset), the on sampler 115A transmits d0, d8, and d16 signals as on-sample signals OS to the channel estimator 117. The late sampler 115B transmits d4, d12, and d20 signals as late-sample signals LS, ½ chip later than the on sampler 115A, to the channel estimator 117.

If $T_{comp\_sub}$ in units of ⅛ chips is 1, then the on sampler 115A outputs d0, d9, and d17 signals as on-sample signals OS, and the late sampler 115B outputs d4, d13, and d21 signals as late-sample signals LS, and compensates for the time offset in units of ⅛ chips.

If $T_{comp\_sub}$ in units of ⅛ chips is −1, then the on sampler 115A outputs d0, d7, and d15 signals as on-sample signals OS, and the late sampler 115B outputs d4, d11, and d19 signals as late-sample signals LS, and compensates for the time offset in units of −⅛ chips.

According to an embodiment of the present invention, the modem 100 may prevent reception performance degradation, occurring due to a time drift between the base transceiver station and the terminal. Because the modem 100 tracks the time offset $T_{offset}$ using the channel estimation result, additional hardware may be minimized.

The TOM 118A may measure a time offset every certain period to track the time drift. For example, the TOM 118A may measure a time offset every slot, every sub-frame, or every frame. Further, the TOM 118A may measure a time offset every multiple of a slot, sub-frame, or frame period.

In the case of the HSDPA receiver 110, one frame is 10 msec. One frame includes 15 slots. One slot includes 2560 chips. One chip is 3.84 MHz. In other words, one chip is 260 nsec. In an embodiment of the present invention, a tap may be set to one of ½ chip, ¼ chip, ⅛ chip, 1/16 chip, 1/32 chip or 1/64 chip (i.e. a sub-chip). The tap is not limited thereto.

The time offset is measured by the time tracker 118, and time delay may occur until a time at which the time offset compensates. Therefore, an operation of the time tracker 118 may be stopped until a loop of the time tracker 118 is stable (i.e., until the time offset compensates).

Figure 7:
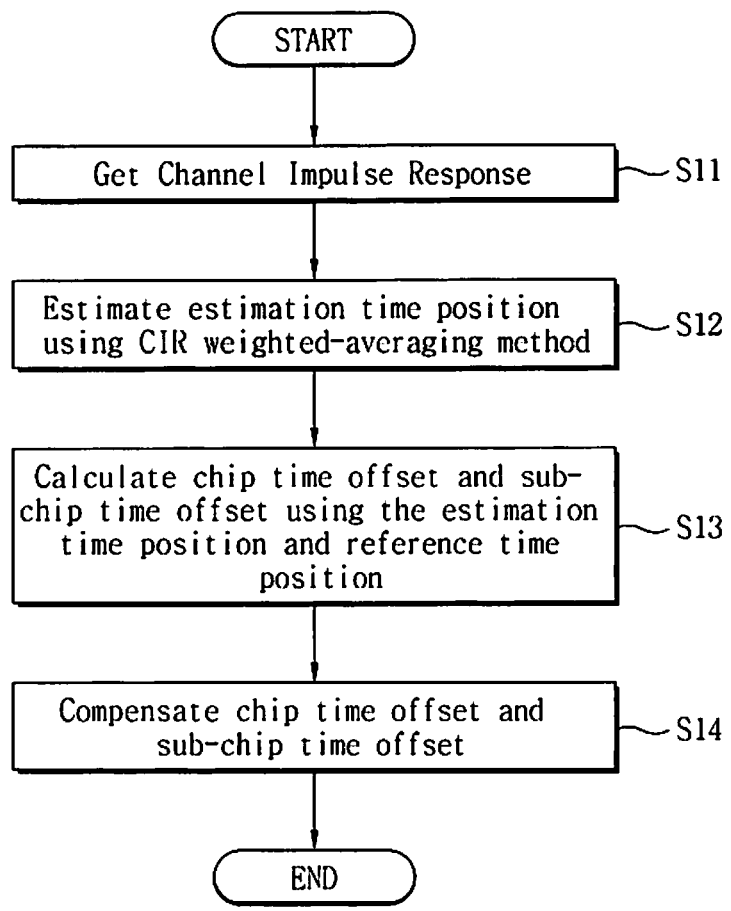
FIG. 7 is a flowchart illustrating a driving method of the channel estimator and the time tracker of FIG. 5, according to an embodiment of the present invention.

FIG. 7 is a flowchart illustrating a driving method of the channel estimator and the time tracker of FIG. 5, according to an embodiment of the present invention.

Referring to FIGS. 2, 5 and 7, in step S11, the channel estimator 117 computes a CIR. The channel estimator 117 estimates a channel in units of taps from a plurality of sub-chip channel estimators S1 to Sn and the PN code generator 117A. Each sub-chip channel estimator calculates a correlation using a correlation operation. The channel estimator 117 extracts valid taps based on the correlation.

In step S12, the time tracker 118 estimates an estimation time position $T_p$ using the plurality of valid taps.

In step S13, the time tracker 118 calculates an instantaneous time offset using the estimation time position $T_p$ and a reference time position $T_{ref}$, and an average time offset is obtained based thereon. The time tracker 118 calculates the time offset $T_{comp\_chip}$ of a chip unit and the time offset $T_{comp\_sub}$ of a sub-chip unit based on an average time offset $T_{avg\_offset}$.

In step S14, the time offset $T_{comp\_chip}$ of a chip unit may compensate through timing regulating of the data buffer, and the time offset $T_{comp\_sub}$ of a sub-chip unit may compensate through on-sample and late-sample position regulating in the on-late sampler 115.

Figure 8:
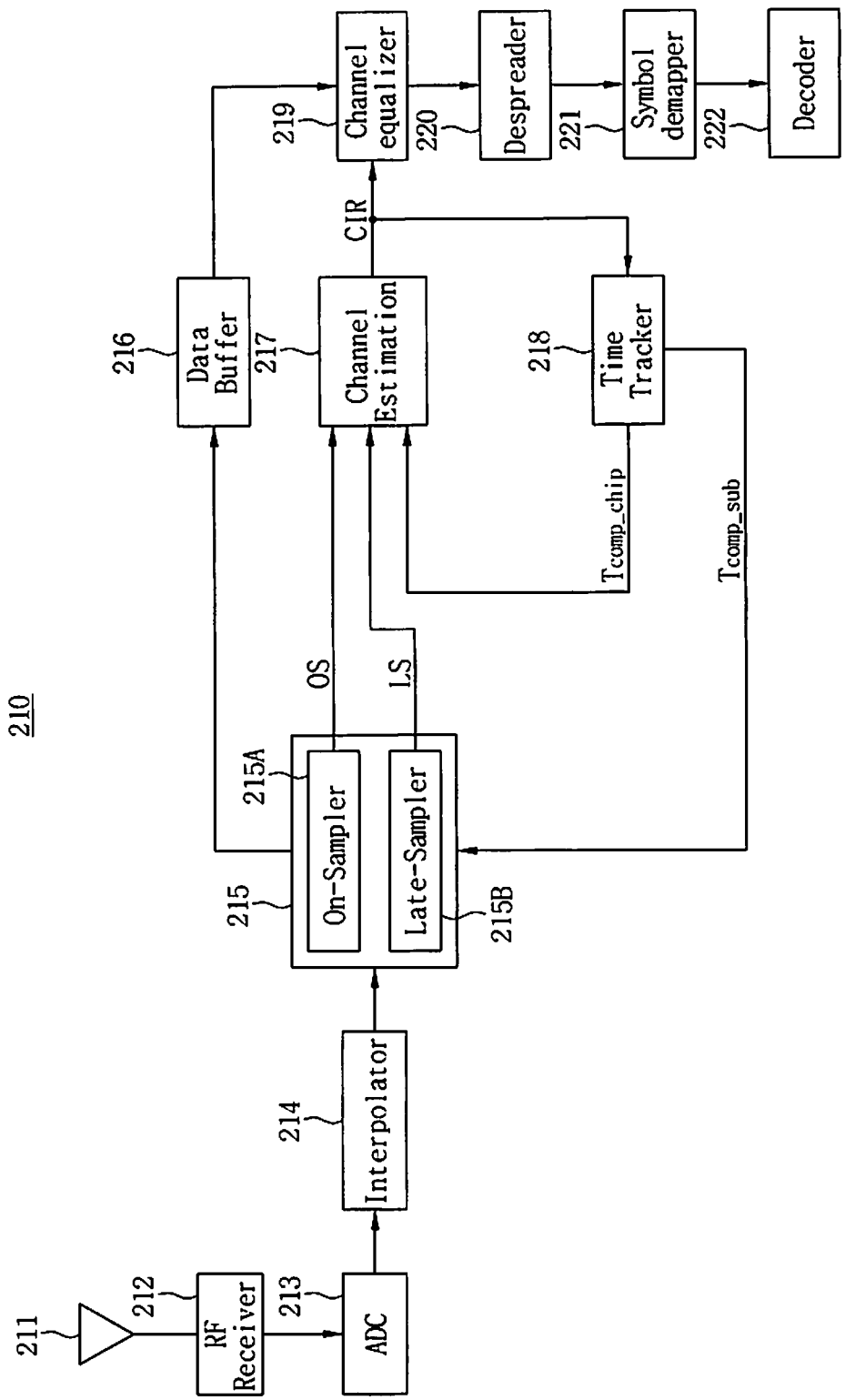
FIG. 8 is a block diagram illustrating an HSDPA receiver, according to another embodiment of the present invention.

FIG. 8 is a block diagram illustrating the HSDPA receiver, according to another embodiment of the present invention.

Referring to FIG. 8, an HSDPA receiver 210 includes a receive antenna 211, an RF receiver 212, an ADC 213, an interpolator 214, an on-late sampler 215, a data buffer 216, a channel estimator 217, a time tracker 218, a channel equalizer 219, a despreader 220, a symbol demapper 221, and a decoder 222.

The HSDPA receiver 210 of FIG. 8 has a structure similar to that of the HSDPA receiver 110 of FIG. 2.

The on-late sampler 215 receives interpolated data, and generates data to perform channel estimation using the interpolated data. The on-late sampler 215 includes an on sampler 215A and a late sampler 215B.

The on sampler 215A transmits an on-sample signal OS to the data buffer 216. The late sampler 215B transmits a late-sample signal LS to the data buffer 216. The on-late sampler 215 compensates for a time offset of a sub-chip unit.

The data buffer 216 receives the on-sample signal OS and the late-sample signal LS from the on-late sampler 215, and transmits the signals OS and LS to the channel equalizer 219.

The channel estimator 217 performs channel estimation using a digital signal output from the on-late sampler 215. The channel estimator 217 outputs a CIR using the channel estimated result to the time tracker 218 and the channel equalizer 219. Further, the channel estimator 217 may compensate for a time offset of a chip unit. The channel estimator 217 is described in greater detail below, with reference to FIG. 9.

Figure 9:
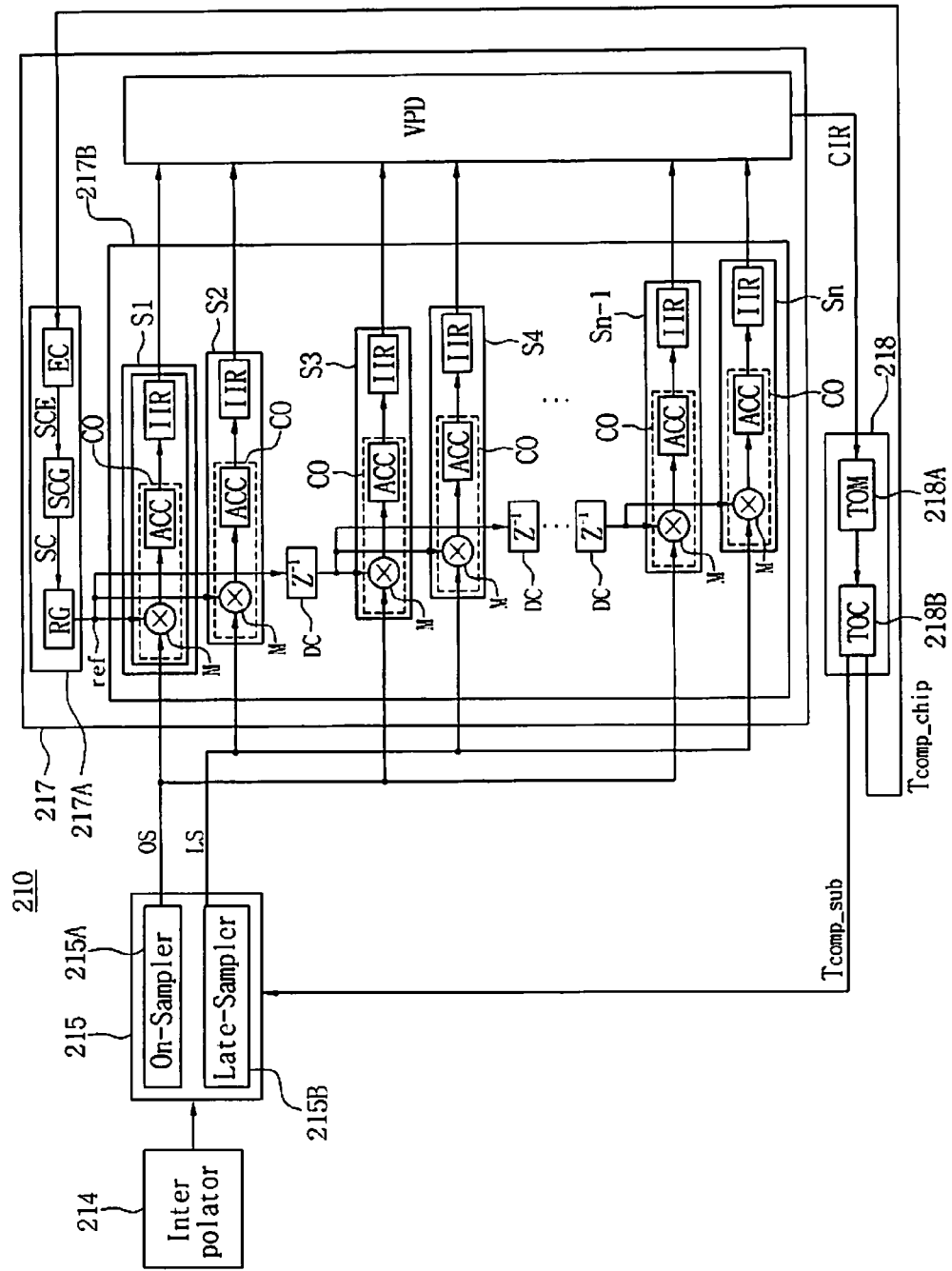
FIG. 9 is a block diagram illustrating a channel estimator and a time tracker of FIG. 8, according to an embodiment of the present invention.

FIG. 9 is a block diagram illustrating the channel estimator and the time tracker of FIG. 8, according to an embodiment of the present invention.

Referring to FIGS. 8 and 9, the channel estimator 217 includes a PN code generator 217A, a sub-channel estimator 217B, and a VPD. The PN code generator 217A includes an Enable Controller (EC), an SCG, and an RG.

The EC receives a time offset $T_{comp\_chip}$ of a chip unit transmitted from a TOC 218B of the time tracker 218, which also includes a TOM 218A. The EC transmits a scramble code enable signal SCE in response to the time offset $T_{comp\_chip}$ of a chip unit to the SCG. The SCG generates a scramble code signal SC to identify a base transceiver station in response to the scramble code enable signal SCE.

Figure 10:
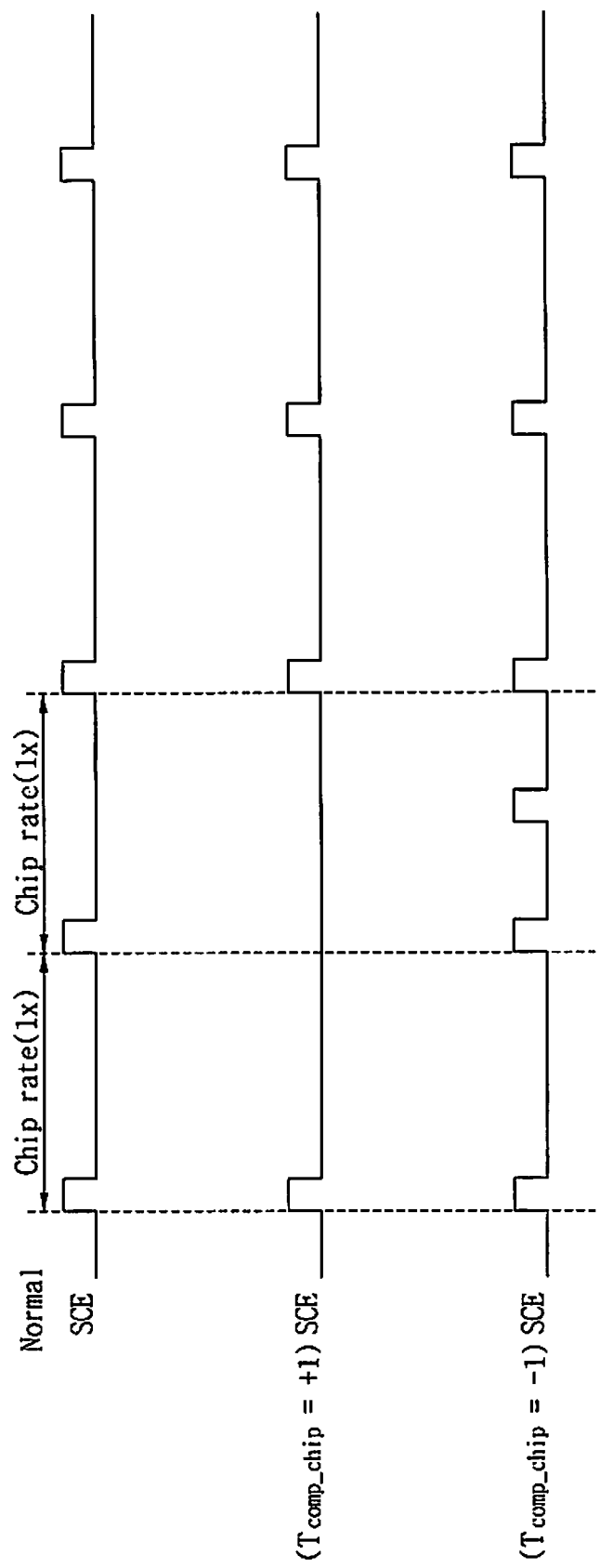
FIG. 10 shows timing for control of generation timing of a scramble code signal in the enable controller of FIG. 9, according to an embodiment of the present invention.

FIG. 10 shows timing for control of generation timing of a scramble code signal in the enable controller of FIG. 9, according to an embodiment of the present invention.

Referring to FIGS. 9 and 10, if a time offset $T_{comp\_chip}$ of a chip unit is 0 (i.e. $T_{comp\_chip}$=0), the EC enables the scramble code enable signal SCE once every chip duration.

If the time offset $T_{comp\_chip}$ of a chip unit received from the TOC 218B is +1, as the enable controller EC does not enable the scramble code enable signal SCE during one chip duration, a time offset compensates by +1 chip by delaying scramble code generation by one chip.

If the time offset $T_{comp\_chip}$ of a chip unit received from the TOC 218B is −1, as the enable controller EC enables the scramble code enable signal SCE twice during one chip duration, a time offset compensates by −1 chip by quickening the scramble code generation by one chip.

Figure 11:
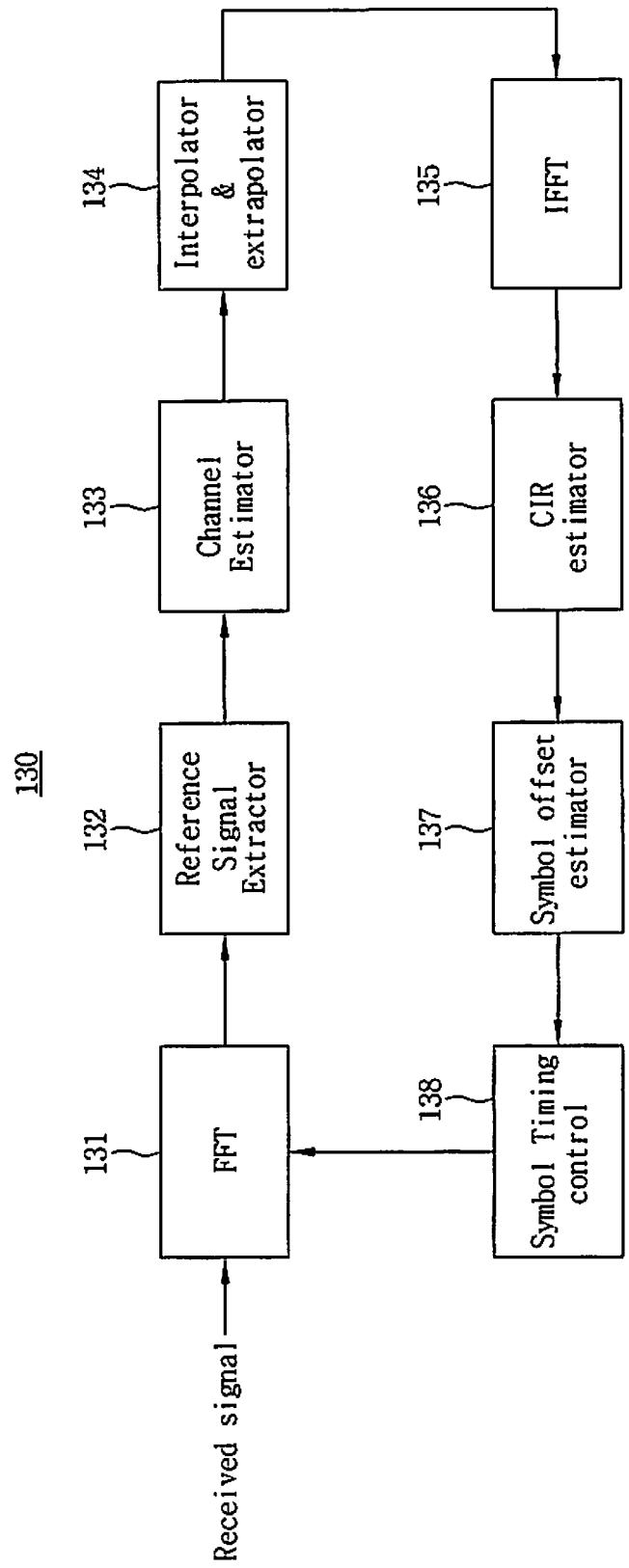
FIG. 11 is a block diagram illustrating an Orthogonal Frequency Division Multiplexing (OFDM) receiver or an Orthogonal Frequency Division Multiple Access (OFDMA) receiver of FIG. 1, according to an embodiment of the present invention.

FIG. 11 is a block diagram illustrating the OFDM receiver or the OFDMA receiver of FIG. 1, according to an embodiment of the present invention.

Referring to FIGS. 1 and 11, the OFDM receiver 130 or the OFDMA receiver 150 may extract reference signals from a frequency domain, perform an Inverse Fast Fourier Transform (IFFT) operation on the reference signals and compute CIR information, estimate a symbol offset, and compensate for the symbol offset using the CIR information. In the case of a Wireless Local Area Network (WLAN), a Long Training Field (LTF) symbol and pilot subcarriers may be used as a reference signal, and in the case of Long Term Evolution (LTE), a Reference Signal (RS) may be used as a reference signal.

In an embodiment of the present invention, the OFDM receiver 130 includes a Fast Fourier Transform (FFT) 131, a reference signal extractor 132, a channel estimator 133, an interpolator-extrapolator 134, an IFFT 135, a CIR estimator 136, a symbol offset estimator 137, and a symbol timing controller 138. In another embodiment of the present invention, the OFDMA receiver 150 has the same structure as the OFDM receiver 130.

An operation of the OFDM receiver 130 or the OFDMA receiver 150, in the case of WLAN, is described as follows: initial OFDMA symbol timing may be obtained by time domain processing of a Short Training Field (STF) and an LTF.

The FFT 131 transmits a result of an FFT operation to the reference signal extractor 132. The reference signal extractor 132 extracts an LTE symbol, and extracts pilot subcarriers of data symbol duration.

The channel estimator 133 performs channel estimation in a frequency domain. A channel estimation method includes performing multiplication on a conjugation value of reference sequence of each subcarrier and each subcarrier extracted from the reference signal extractor 132.

The interpolator-extrapolator 134 performs a function in which a frequency channel response of the subcarriers of empty duration is obtained through interpolation and extrapolation processes using the subcarriers having meaningful values.

The IFFT 135 obtains a time domain channel by executing an IFFT operation with a frequency domain channel obtained by the channel estimator 133 and the interpolator-extrapolator 134.

The CIR estimator 136 extracts only a channel having a meaningful value from the time domain channel received from the IFFT 135, and estimates a CIR.

The symbol offset estimator 137 estimates symbol timing using a weighted-average method with the CIR, compares the symbol timing with reference symbol timing, and calculates a symbol time offset.

The symbol timing controller 138 regulates a starting point of data used in the FFT operation using the calculated symbol time offset.

Figure 12:
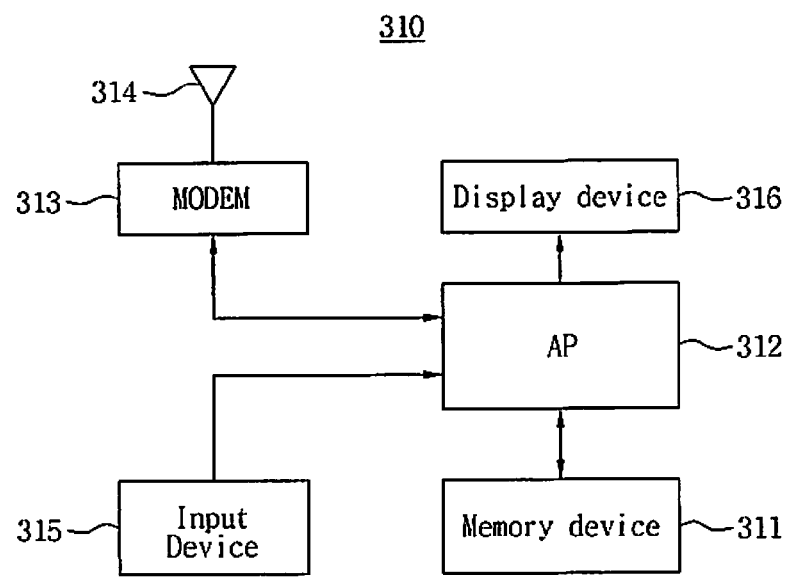
FIG. 12 is a diagram illustrating a computer system including the modem of FIG. 1, according to an embodiment of the present invention.

FIG. 12 is a diagram illustrating a computer system including the modem of FIG. 1, according to an embodiment of the present invention.

Referring to FIG. 12, a computer system 310 may be implemented as a PC, a network server, a tablet PC, a net-book, an e-reader, a smart-phone, a Personal Digital Assistant (PDA), a Portable Multimedia Player (PMP), an MP3 player, or an MP4 player.

The computer system 310 includes a memory device 311, an Application Processor (AP) 312 including a memory controller configured to control the memory device 311, a modem 313, an antenna 314, an input device 315, and a display device 316.

The modem 313 may send and receive a wireless signal through the antenna 314. For example, the modem 313 may change the wireless signal received through the antenna 314 into a signal to be processed in the AP 312. In an embodiment of the present invention, the modem 313 may include an LTE transceiver, an HSDPA/Wideband Code Division Multiple Access (WCDMA) transceiver, and a Global System for Mobile Communications (GSM) transceiver.

Therefore, the AP 312 may process a signal output from the modem 313, and transmit the processed signal to the display device 316. The modem 313 may change a signal output from the AP 312 into a wireless signal, and output the changed wireless signal to an outside device through the antenna 314.

The input device 315 is a device in which a control signal, to control an operation of the AP 312 or data to be processed by the AP 312, may be input. Thus, the input device 315 may be implemented as a touch pad, a pointing device such as a computer mouse, a keypad, or a keyboard.

According to an embodiment of the present invention, the modem 313 may include the modem 100 of FIG. 1.

Figure 13:
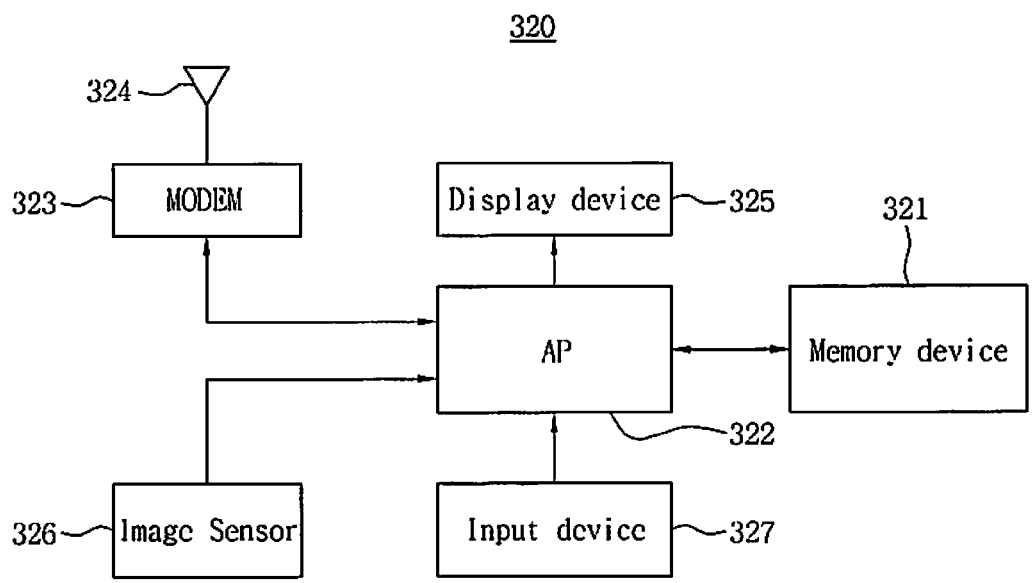
FIG. 13 is a diagram illustrating a computer system including the modem of FIG. 1, according to another embodiment of the present invention.

FIG. 13 is a diagram illustrating a computer system including the modem of FIG. 1, according to another embodiment of the present invention.

Referring to FIG. 13, a computer system 320 may be implemented as an image processing device, such as, for example, a digital camera or a mobile phone, a smart phone, or a tablet on which a digital camera is mounted.

The computer system 320 includes a memory device 321, an Application Processor (AP) 322 including a memory controller configured to control a data processing operation, for example, a write operation or a read operation of the memory device 321, a modem 323, an antenna 324, a display device 325, an image sensor 326, and an input device 327.

The modem 323 may send or receive a wireless signal through the antenna 324. For example, the modem 323 may change a wireless signal received through the antenna 324 into a signal to be processed in the AP 322. Therefore, the AP 322 may process a signal output from the modem 323, and transmit the processed signal to the display device 325.

Further, the modem 323 may change a signal output from the AP 322 into a wireless signal, and output the changed wireless signal to an outside device through the antenna 324.

The image sensor 326 of the computer system 320 converts optical images into digital signals, and the converted digital signals are transmitted to the AP 322. The converted digital signals may be displayed through the display device 325, or may be stored in the memory device 321, according to the control of the AP 322.

Further, the data stored in the memory device 321 may be displayed through the display device 325, according to the control of the AP 322.

The input device 327 is a device in which a control signal, to control an operation of the AP 322 or data to be processed by the AP 322, may be input. Thus, the input device 315 may be implemented as a touch pad, a pointing device such as a computer mouse, a keypad, or a keyboard.

According to an embodiment of the present invention, the modem 323 may include the modem 100 of FIG. 1.

Software components including instructions or code for performing the methodologies described herein may be stored in one or more of the associated memory devices (e.g., Read Only Memory (ROM), fixed or removable memory) and, when ready to be utilized, loaded in part or in whole (e.g., into Random Access Memory (RAM)) and executed by an AP.

The present invention may be utilized in conjunction with the manufacture of integrated circuits. Regarding integrated circuits in general, a plurality of identical die are typically formed in a repeated pattern on a surface of a semiconductor wafer. Each die may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

The modem having the HSDPA receiver, the OFDM receiver, or the OFDMA receiver estimates and compensates for a time offset due to time drift, thereby preventing degradation of performance due to time drift.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A modem, comprising:
a channel estimator configured to compute a Channel Impulse Response (CIR) through channel estimation; and
a time tracker configured to estimate an estimation time position by applying a weighted-average method to the CIR, measure a time offset by comparing the estimation time position with a reference time position, and compensate for the time offset,
wherein the time tracker includes:
a Time Offset Measurement (TOM) unit configured to compare the estimation time position with the reference time position, calculate an instantaneous time offset using a result of a comparison of the estimation time position and the reference time position, and calculate an average time offset by filtering the instantaneous time offset; and
a Time Offset Compensation (TOC) unit configured to generate a time offset of a chip unit and a time offset of a sub-chip unit using the average time offset, transmit the time offset of the chip unit to a data buffer, and transmit the time offset of the sub-chip unit to an on-late sampler.

2. The modem of claim 1, wherein the on-late sampler is configured to regulate timing of a data signal in units of sub-chips in response to the time offset of the sub-chip unit.

3. The modem of claim 2, wherein the data buffer is configured to regulate the timing of the data signal in units of chips in response to the time offset of the chip unit.

4. The modem of claim 1, wherein the TOM unit comprises a low pass filter configured to remove noise from the instantaneous time offset, and the TOM unit is further configured to apply the low pass filter to the instantaneous time offset to calculates the average time offset.

5. The modem of claim 1, wherein the channel estimator is further configured to perform a correlation operation on a reference signal and a data signal in units of taps.

6. The modem of claim 5, wherein a tap is set in units of sub-chips, and the sub-chips include one of ½, ¼, ⅛, 1/16, 1/32, and 1/64 chip rates.

7. The modem of claim 6, wherein the reference signal is generated by a combination of a Common Pilot Channel (CPICH) signal and a scramble code signal.

8. The modem of claim 6, wherein the correlation operation comprises calculation of a correlation using the reference signal and the data signal, and the channel estimator is configured to compute the CIR based on the correlation.

9. The modem of claim 7, wherein the channel estimator is further configured to receive a time offset of a chip unit, and control generation of the scramble code signal based on the time offset of the chip unit.

10. The modem of claim 9, wherein the channel estimator is further configured to control timing of the data signal in units of chips through the control of the scramble code signal.

11. The modem of claim 1, wherein the on-late sampler is configured to generate an on sample signal and a late sample signal for channel estimation of a sub-chip unit, and the data buffer stores the on sample signal and the late sample signal.

12. A method for driving a modem, the method comprising the steps of:
- computing a Channel Impulse Response (CIR) through channel estimation;
- estimating an estimation time position by applying a weighted-average method to the CIR;
- comparing the estimation time position with a reference time position;
- calculating an instantaneous time offset using a result of a comparison of the estimation time position and the reference time position;
- calculating an average time offset by filtering the instantaneous time offset;
- generating a time offset of a chip unit and a time offset of a sub-chip unit using the average time offset;
- transmitting the time offset of the chip unit to a data buffer; and
- transmitting the time offset of the sub-chip unit to an on-late sampler.

13. The method of claim 12, wherein compensating for the time offset comprises compensating for the time offset in units of chips using the time offset of the chip unit.

14. The method of claim 12, wherein compensating for the time offset comprises compensating for the time offset in units of sub-chips using the time offset of the sub-chip unit.

15. A modem comprising:
- an on-late sampler configured to receive data and output an on-sample signal and a late-sample signal based on the data;
- a data buffer configured to receive the on-sample signal and the late-sample signal from the on-late sampler, and output the on-sample signal and the late-sample signal;
- a channel estimator configured to receive the on-sample signal and the late-sample signal from the data buffer, perform channel estimation using the on-sample signal and the late-sample signal to generate a Channel Impulse Response (CIR), and output the CIR;
- a time tracker configured to receive the CIR from the channel estimator, measure a time offset of a chip unit and a time offset of a sub-chip unit using the CIR, regulate timing of the data buffer using the time offset of the chip unit, and regulate timing of the on-late sampler using the time offset of the sub-chip unit,
- wherein the time tracker comprises:
  - a Time Offset Measurement (TOM) unit configured to compare an estimation time position with a reference time position, calculate an instantaneous time offset using a result of a comparison of the estimation time position and the reference time position, and calculate an average time offset by filtering the instantaneous time offset; and
  - a Time Offset Compensation (TOC) unit configured to generate the time offset of the chip unit and the time offset of the sub-chip unit using the average time offset, transmit the time offset of the chip unit to the data buffer, and transmit the time offset of the sub-chip unit to the on-late sampler.

16. The modem of claim 15, wherein the channel estimator is further configured to calculate a correlation using a reference signal and a data signal, and compute the CIR based on the correlation.

* * * * *